(12) United States Patent
Power et al.

(10) Patent No.: US 11,304,262 B2
(45) Date of Patent: Apr. 12, 2022

(54) BRAKING ENERGY DISSIPATION (71) Applicant: Airbus Operations Limited, Bristol (GB)

(72) Inventors: Joseph Power, Bristol (GB); Sebastien Gaud, Bristol (GB); David Paviour, Bristol (GB); Bradley Heal, Bristol (GB); Fraser Wilson, Bristol (GB)

(73) Assignee: Airbus Operations Limited, Bristol (GB)

( * ) Notice: Subject to any disclaimer, the term of this patent is extended or adjusted under 35 U.S.C. 154(b) by 413 days.

(21) Appl. No.: 16/343,801

(22) PCT Filed: Nov. 8, 2017

(86) PCT No.: PCT/EP2017/078571
§ 371 (c)(1),
(2) Date: Apr. 22, 2019

(87) PCT Pub. No.: WO2018/087128
PCT Pub. Date: May 17, 2018

(65) Prior Publication Data
US 2019/0261458 A1  Aug. 22, 2019

(30) Foreign Application Priority Data
Nov. 11, 2016  (GB) ...................... 1619098

(51) Int. Cl.
*H05B 1/02* (2006.01)
*B60L 7/02* (2006.01)
(Continued)

(52) U.S. Cl.
CPC .............. *H05B 1/0236* (2013.01); *B60L 7/02* (2013.01); *B60L 7/14* (2013.01); *B60L 7/22* (2013.01); *B60L 7/26* (2013.01); *B64C 25/42* (2013.01); *B64C 25/426* (2013.01); *F22B 1/284* (2013.01); *F22B 1/285* (2013.01); *H05B 1/0297* (2013.01)

(58) Field of Classification Search
None
See application file for complete search history.

(56) References Cited

U.S. PATENT DOCUMENTS 3,952,182 A * 4/1976 Flanders ............ G05D 23/1912
                                                            392/466
5,418,437 A * 5/1995 Couture .................. B60L 50/61
                                                            318/139
(Continued)

FOREIGN PATENT DOCUMENTS

GB        2 525 019      10/2015
WO      2007/064381        6/2007

OTHER PUBLICATIONS

International Search Report and Written Opinion of the ISA of PCT/EP2017/078571 dated Jan. 22, 2018, 12 pages.

*Primary Examiner* — Thor S Campbell
(74) *Attorney, Agent, or Firm* — Nixon & Vanderhye P.C.

(57) ABSTRACT

An apparatus for dissipating braking energy generated by the operation of a vehicle brake. The apparatus includes a heating element configured to receive electric current generated by operation of the vehicle brake, the heating element arranged in a chamber for containing liquid. The apparatus is configured such that liquid contained in the chamber is heated in response to operation of the vehicle brake.

21 Claims, 7 Drawing Sheets

(51) Int. Cl.
*B60L 7/26* (2006.01)
*B60L 7/22* (2006.01)
*B64C 25/42* (2006.01)
*F22B 1/28* (2006.01)
*B60L 7/14* (2006.01)

(56) References Cited

U.S. PATENT DOCUMENTS

| | | | | |
|---|---|---|---|---|
| 7,096,098 B2* | 8/2006 | Auguet | ............... | B60L 50/61 701/22 |
| 8,370,013 B2* | 2/2013 | Linda | ............... | B60T 8/17616 701/22 |
| 8,494,699 B2* | 7/2013 | Bourqui | ............... | B60L 7/26 701/22 |
| 9,134,730 B2* | 9/2015 | Lemay | ............... | G05D 1/0083 |
| 2002/0183161 A1* | 12/2002 | Charaudeau | ............... | B60K 6/34 477/3 |
| 2005/0224642 A1 | 10/2005 | Sullivan | | |
| 2006/0103358 A1* | 5/2006 | Schulte | ............... | B60L 7/06 320/166 |
| 2006/0188241 A1* | 8/2006 | Higham | ............... | B05B 9/002 392/473 |
| 2007/0272116 A1* | 11/2007 | Bartley | ............... | B60T 13/662 105/35 |
| 2008/0073970 A1* | 3/2008 | Griffith | ............... | B60T 8/1703 303/152 |
| 2008/0154443 A1* | 6/2008 | Godo | ............... | B60T 13/74 701/3 |
| 2008/0174174 A1* | 7/2008 | Burns | ............... | B60W 20/13 303/152 |
| 2009/0234525 A1* | 9/2009 | Bourqui | ............... | B60L 3/0023 701/22 |
| 2009/0256415 A1* | 10/2009 | Bourqui | ............... | B60L 3/0092 303/3 |
| 2009/0272608 A1* | 11/2009 | Bourqui | ............... | B60L 3/0046 188/160 |
| 2010/0065386 A1* | 3/2010 | Bourqui | ............... | B60L 7/06 188/159 |
| 2010/0256887 A1* | 10/2010 | Linda | ............... | B60T 8/1755 701/82 |
| 2011/0061364 A1* | 3/2011 | Raman | ............... | B60L 7/22 60/274 |
| 2013/0034344 A1* | 2/2013 | Lutz | ............... | F24H 9/128 392/449 |
| 2016/0318501 A1* | 11/2016 | Oldridge | ............... | B60W 20/10 |

* cited by examiner

BRAKING ENERGY DISSIPATION

RELATED APPLICATIONS

This application is the U.S. national phase of International Application PCT/EP2017/078571 filed Nov. 8, 2017, which designated the U.S. and claims priority to United Kingdom Patent Application GB 1619098.5, filed Nov. 11, 2016, the entirety of both applications are incorporated by reference.

TECHNICAL FIELD

The present invention relates to an apparatus and method for dissipating braking energy generated by operation of a vehicle brake, and in particular to an apparatus and method for dissipating braking energy generated by operation of an aircraft brake, during taxi.

BACKGROUND

Vehicle braking can generate a large amount of energy in a non-useful form. In many applications, kinetic energy of the vehicle is converted to another, non-useful form of energy, often thermal energy, to effect braking. In some applications, the non-useful energy is converted into a form which can be either used immediately or stored until needed. For example, the non-useful energy may be converted to electrical energy and stored in a battery. Vehicle braking can generate enough energy to cause overheating of components located near the brakes, so it may be necessary to remove the non-useful energy from a brake location.

Some vehicles employ electric motors, which may be AC or DC motors. For example, electric motors can be used to drive wheels of an aircraft during taxi. It has been proposed to use these electric motors for braking the vehicle. This can be achieved, for example, by using the electric motors as generators driven by spinning of the vehicle wheels, to generate an electrical current. This conversion of kinetic energy into electrical energy removes kinetic energy from the wheels and slows their rotation. The use of electric motors in this way can reduce the wear on consumable braking components and therefore increase the life span of these components.

The electrical current generated by electric braking can be relatively large, yet infrequent. There is a need to safely handle and dissipate the electrical energy generated by electric braking.

The present invention seeks to overcome the aforementioned shortcomings and provide an apparatus and method for dissipating braking energy generated by a vehicle brake.

SUMMARY

A first aspect of the present invention provides an apparatus for dissipating braking energy generated by the operation of a vehicle brake. The apparatus comprises a heating element configured to receive electric current generated by operation of the vehicle brake, the heating element arranged in a chamber for containing liquid. The apparatus is configured such that liquid contained in the chamber is heated in response to operation of the vehicle brake.

Optionally, the apparatus is configured such that liquid contained in the chamber is boiled in response to operation of the vehicle brake.

Optionally, the apparatus comprises an outlet for releasing vapour from the chamber.

Optionally, the apparatus comprises an inlet for receiving liquid into the chamber.

Optionally, the apparatus comprises a liquid sensor to measure an amount of liquid in the chamber. A flow of liquid through the inlet is controlled based on the measured amount of liquid in the chamber.

Optionally, the apparatus comprises a pressure regulator configured to prevent the pressure in the chamber from exceeding a predetermined pressure during operation of the apparatus. The predetermined pressure may be in the range 2 bar to 10 bar.

Optionally, the apparatus comprises a temperature sensor to sense the temperature of liquid in the chamber. The apparatus may be configured to control a flow of liquid through the inlet in dependence on the temperature of liquid in the chamber.

Optionally, the apparatus is configured to control a flow of liquid through the inlet in dependence on a level of the received electric current.

Optionally, the apparatus comprises a pump to control a flow of liquid to the inlet.

Optionally, the apparatus comprises a comprising a controller configured to receive a signal and to control a flow of liquid in to the chamber based on the received signal. The received signal may comprise measurement data generated by a sensor comprised in the apparatus. The received signal may comprise an amount of liquid in the chamber measured by the liquid sensor. The received signal may comprise a temperature in the chamber measured by the temperature sensor. The received signal may comprise a pressure in the chamber measured by a pressure sensor. The received signal may comprise data received from a user interface. The received signal may comprise information relating to an operational parameter of the vehicle brake.

Optionally, the controller is configured to alter the flow of liquid in to the chamber if the received signal meets a predetermined criterion. The predetermined criterion may be defined such that the predetermined criterion is met if a measured amount of liquid in the chamber is less than a predetermined minimum amount and the controller may be configured to increase the flow of liquid in to the chamber if the received signal meets the predetermined criterion.

Optionally, the predetermined criterion is defined such that the predetermined criterion is met if a temperature in the chamber is outside of a predetermined temperature range. The controller may be configured to decrease the flow of liquid into the chamber if the received signal indicates that the temperature in the chamber is less than a lower limit of the predetermined temperature range, and to increase the flow of liquid into the chamber if the received signal indicates that the temperature in the chamber is greater than an upper limit of the predetermined temperature range.

Optionally, the predetermined criterion is defined such that the predetermined criterion is met if a pressure in the chamber is outside of a predetermined pressure range. The controller may be configured to increase the flow of liquid into the chamber if the received signal indicates that the pressure in the chamber is less than a lower limit of the predetermined pressure range, and to decrease the flow of liquid into the chamber if the received signal indicates that the pressure in the chamber is greater than an upper limit of the predetermined pressure range.

Optionally, the vehicle is an aircraft.

Optionally, the vehicle brake is an electromagnetic brake.

A second aspect of the present invention provides an aircraft comprising an apparatus according to the first aspect of the present invention. The aircraft may comprise an electronic braking system. A controller of the first aspect of the present invention may be comprised in an avionics system of the aircraft.

A third aspect of the present invention provides a method of dissipating braking energy generated by the operation of a vehicle brake. The method comprises converting braking energy generated by the operation of a vehicle brake into an electric current, supplying the electric current to a heating element arranged in a chamber containing a liquid, heating the liquid to generate vapour, and releasing the generated vapour from the chamber.

Optionally, the method comprises supplying a flow of liquid to the chamber and regulating the flow of liquid to the chamber. The regulating may be based on one or more of: a liquid volume in the chamber, a temperature in the chamber, and a level of the electric current supplied to the heating element.

Further features and advantages of the invention will become apparent from the following description of preferred embodiments of the invention, given by way of example only, which is made with reference to the accompanying drawings.

BRIEF DESCRIPTION OF THE DRAWINGS

Embodiments of the invention will now be described, by way of example only, with reference to the accompanying drawings, in which.

DETAILED DESCRIPTION

The following description relates to apparatus and methods for dissipating braking energy generated by operation of a vehicle brake. For example, the vehicle brake may be an electric brake of an aircraft. Such apparatus and methods can reduce the size, weight and complexity of apparatus for dissipating braking energy.

In existing systems, electric current generated by electrical braking is dumped into a resistive load, or a capacitor, situated away from the braking site. This can help to reduce damage to components at or near the braking site, in particular electronic components, due to overheating of those components. The resistive loads can be relatively large and heavy, resulting in a larger and heavier vehicle.

Figure 1:
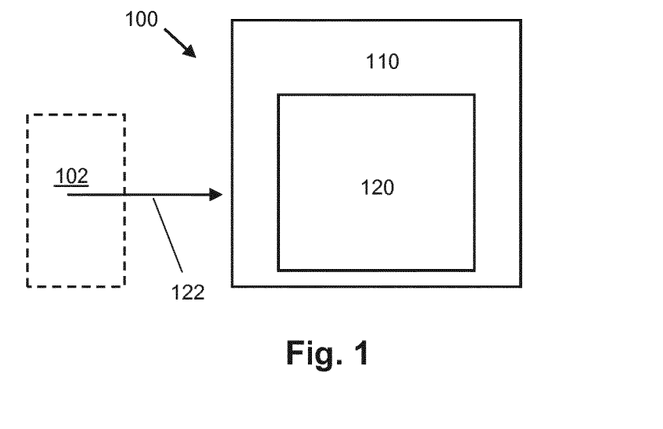
FIG. 1 is a schematic view of an apparatus for dissipating braking energy generated by operation of a vehicle brake, according to an embodiment.

FIG. 1 shows a schematic diagram of an energy dissipation apparatus 100 for dissipating energy generated by operation of a vehicle brake 102. The apparatus comprises a chamber 110 for containing liquid and a heating element 120. The heating element 120 is arranged in the chamber 110 and is configured to receive electric current generated by operation of a vehicle brake 102 via an electrical connection 122. The electric current is generated by operation of the vehicle brake 102. The apparatus 100 is configured such that liquid contained in the chamber 110 is heated in response to operation of the vehicle brake 102. In some examples, the apparatus 100 is configured such that liquid contained in the chamber 110 is boiled in response to operation of the vehicle brake 102.

In some examples, the apparatus 100 may further comprise an inlet (not shown) for receiving liquid into the chamber 110, and an outlet (not shown) for releasing vapour from the chamber 110.

The inlet may comprise an opening through which liquid may flow into the chamber 110, e.g. from a liquid source such as a storage tank. In some examples the inlet may be configured to be connectable to a liquid source, e.g. via a hose, tube or any other component suitable for carrying a flow of liquid. In some examples, the inlet comprises an inlet valve (not shown) configured to control a flow of liquid into the chamber 110. In some examples, the inlet connects a supply of liquid to the chamber 110.

The outlet may comprise an opening through which vapour may exit the chamber 110, e.g. to atmosphere, or to a vapour collection system. In some examples, apparatus, the outlet may be configured to permit vapour to exit at a sufficient rate to ensure that pressure within the chamber 110 does not increase during operation of the apparatus 100. In some examples the chamber 110 may have an open top, in which case the outlet may comprise the open top of the chamber 110. In some examples, the outlet comprises an outlet valve (not shown) configured to control a flow of vapour out of the chamber 110.

In some examples, the apparatus 100 may further comprise one or more sensors (not shown), for example, to measure one or more parameters relating to the operation of the apparatus 100. Such sensors may include, for example, one or more of: a liquid sensor for measuring a parameter relating to an amount of liquid in the chamber 110; a temperature sensor for measuring a parameter relating to a temperature within the chamber 110; a pressure sensor for measuring a parameter relating to a pressure within the chamber 110 and a current sensor for measuring a parameter relating to a current received by the heating element 120.

In some examples, a temperature sensor comprised in the apparatus 100 comprises a thermometer. In other examples, a temperature sensor in the apparatus 100 comprises a sensor to measure a parameter indicative of the temperature of liquid in the chamber 110. For example, the temperature sensor may be arranged to sense a different temperature in the apparatus 100 that is then used to determine (e.g. by a controller of the apparatus 100) the liquid temperature based on the measured different temperature, for example using a correlation or scale factor. The temperature sensor may be connected (by a wired or wireless communications link) to a controller, and may be configured to thereby send temperature measurements to the controller and/or receive control signals from the controller. It should be noted that other examples are possible in which the apparatus 100 does not comprise a temperature sensor.

In some examples, a pressure sensor comprised in the apparatus 100 measures a pressure in the chamber 100. Alternatively, the pressure sensor may be arranged to sense a different pressure in the apparatus 100 that is then used to determine (e.g. by a controller of the apparatus 100) the pressure in the chamber 100 based on the measured different pressure, for example using a correlation or scale factor. The pressure sensor may be located at or near an inlet to the chamber 110. Alternatively, a pressure sensor may be located at or near an outlet of the chamber 110, or at any other suitable location. The pressure sensor may be of any suitable type known in the art. The pressure sensor may be connected (by a wired or wireless communications link) to a controller of the apparatus 100, and may be configured to thereby send pressure measurements to the controller and/or receive control signals from the controller. It should be noted that other examples are possible in which the apparatus 100 does not comprise a pressure sensor.

In some examples, a current sensor comprised in the apparatus 100 measures a current received by the heating element 120. In some examples, the current sensor comprises an Ammeter. In other examples, the current sensor comprises a sensor to measure a parameter indicative of the current received by the heating element 120. For example, the current sensor may be arranged to sense a different current in the apparatus 100 that is then used to determine (e.g. by a controller of the apparatus 100) the current received by the heating element 120 based on the measured different current, for example using a correlation or scale factor. The current sensor 390 may be connected (by a wired or wireless communications link) to the controller 304, and may be configured to thereby send current measurements to the controller 304 and/or receive control signals from the controller 304. The current sensor may be provided in addition to one or both of the temperature sensor and the pressure sensor. It should be noted that other examples are possible in which the apparatus 100 does not comprise a current sensor.

In some examples, the apparatus 100 may further comprise a pump to control a flow of liquid into the chamber 110. For example, through an inlet of the apparatus. The pump is configured to deliver liquid from a supply of liquid to the chamber 110. The pump may be configured to alter a flow of liquid to the chamber 110 in dependence on one of more of: a temperature of the liquid in the chamber 110, a pressure in the chamber 110 and a level of electric current received by the heating element 120 from the vehicle brake 102. The pump may be connected (by a wired or wireless communications link) to a controller of the apparatus 100, and may be configured to thereby receive control signals from the controller and/or to send state information to the controller. In some examples the pump may be configured to alter a flow of liquid in to the chamber 110 in response to a control signal received from the controller. For example, a control signal from the controller may be based on a measured operational parameter of the apparatus 100.

In some examples, the apparatus 100 may further comprise a controller (not shown) to control one or more aspects of the operation of the apparatus 100, as will be described in more detail below. In some examples, the controller may be comprised in a control system of the vehicle. The controller 304 may comprise any suitable type of controller known in the art. For example, the controller 304 may comprise a processor.

In this example, the chamber 110 is for containing water and the liquid may comprise water. In yet other examples, the liquid may be a liquid other than water and the chamber may be configured to contain such a liquid other than water.

In some examples, the electrical connection 102 comprises a one or more low resistance wires that form a connection between the vehicle brake 102 and the heating element 120. However, any other suitable electrical connection may be used.

In any given example, the chamber 110 is formed from any materials suitable for containing the liquid to be used in that example at the boiling temperature of that liquid. In some examples, the chamber 110 comprises stainless steel. In other example, the chamber 110 is formed from any other suitable materials, as known in the art.

The shape of the chamber 110 may be selected in dependence on the shape of the heating element. For example, the shape of the chamber 110 may closely conform to the shape of the heating element 120 to maximise energy transfer from the heating element 120 to the liquid in the chamber 110. The shape of the chamber 110 may be selected to reduce or minimize the amount of liquid contained in the chamber 110, so that the transition from heating water to steam production is reduced or minimized. In some examples, the chamber 110 is generally cylindrical in shape. In an example in which the heating element 120 comprises a coil, the shape of the chamber 110 is such that it substantially fills the void inside the coil.

The dimensions of the chamber 110 may be selected such that the volume and weight of the chamber 110 are within certain parameters. For example, for some applications it may be desirable to minimise the volume and weight of the chamber 110. This offers the advantage of helping to reduce the weight and size of the overall apparatus 100, thus reducing the load to be carried by the vehicle. The amount of liquid that can be contained in the chamber 110 is also minimised in such examples, thus boiling of the liquid contained in the chamber 110 is achieved faster. The volume of the chamber 110 will be dependent at least on an operating pressure of the apparatus 100 and the amount of braking energy to be dissipated by the apparatus 100. The volume of the chamber 110 may be determined based on the anticipated energy to be dissipated by the apparatus 100 during a braking event. In some examples, e.g. examples in which the brake is an aircraft brake, the volume of the chamber 110 is between 1.0 L and 2.0 L. In some examples, the volume of the chamber 110 is between 1.5 L and 1.7 L. In other examples, the chamber 110 may have a volume less than 1.0 L or greater than 2.0 L. There is a need to balance the advantages of a pressurised apparatus with keeping the equipment required for the apparatus 100 manageable.

The operating pressure of the apparatus 100 will influence the amount of energy required to boil the liquid in the chamber 110. As such, as pressure in the chamber 110 increases, a smaller amount of liquid is required to dissipate the same amount of energy because it takes longer to boil and turn to vapour. The amount of braking energy to be dissipated by the apparatus 100 will influence how quickly vapour will be formed from the liquid in the chamber 110. As such, for applications where a greater amount of braking energy is to be dissipated by the apparatus 100, it may be beneficial to increase the volume of the chamber 110 so that it can contain a greater amount of liquid.

Figure 6:
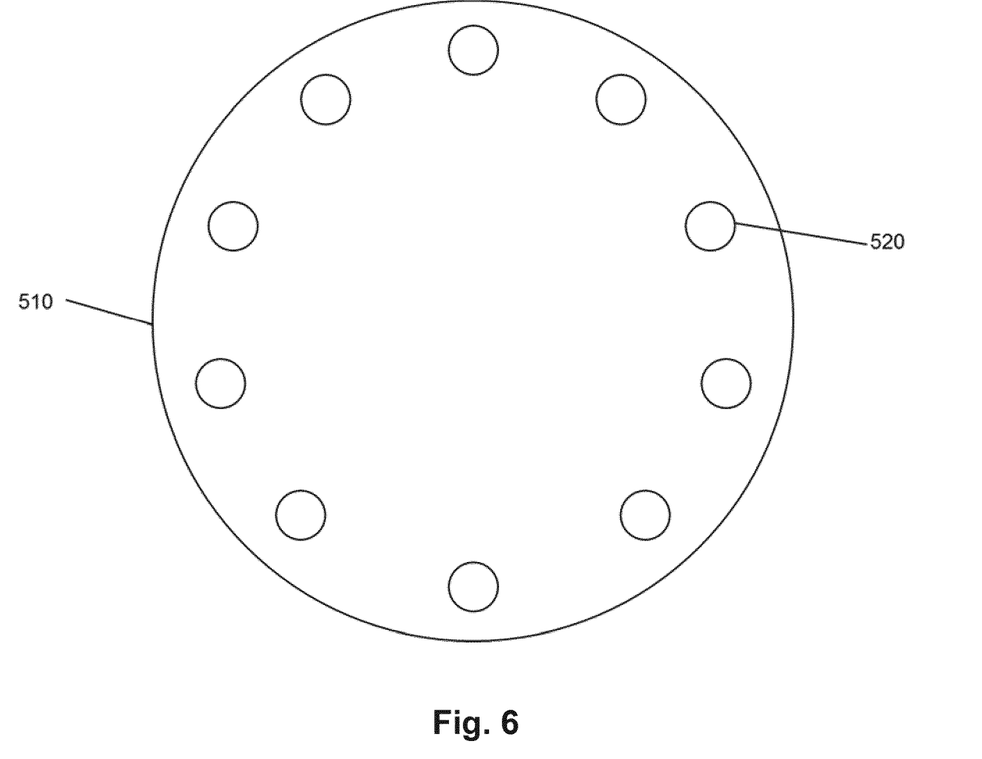
FIG. 6 is a top view of part of an apparatus for dissipating braking energy generated by operation of a vehicle brake, according to an embodiment.

FIG. 6 shows a top view of an example chamber 510 (which may have any of the features of the chamber 110, as described herein) for use with the apparatus 100. In this example, the heating element 520 (which may have any of the features of the heating element 120, as described herein) comprises a plurality of tubes around the circumference of the chamber 510, which extend from the top of the chamber 510 towards the bottom of the chamber 510. In other examples, the plurality of tubes extend from the bottom of the chamber 510 towards the top of the chamber 510.

Figure 7:
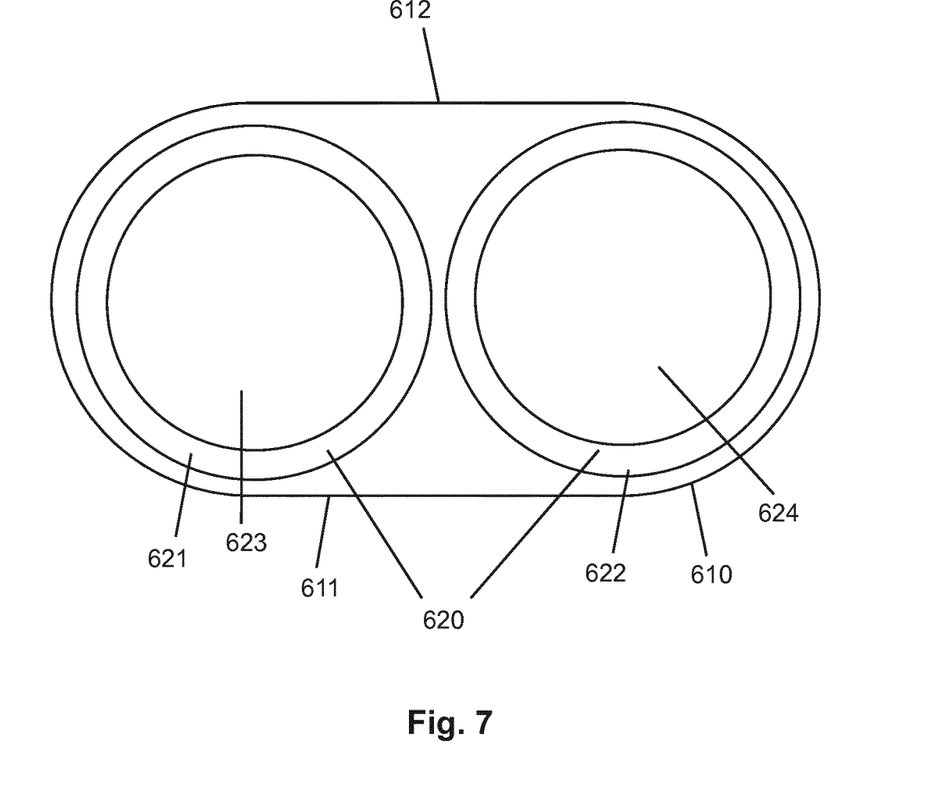
FIG. 7 is a top view of part of an apparatus for dissipating braking energy generated by operation of a vehicle brake, according to an embodiment.

FIG. 7 shows a top view of an example chamber 610 (which may have any of the features of the chamber 110, as described herein) for use with the apparatus 100. In this example, the heating element 620 (which may have any of the features of the heating element 120, as described herein) comprises a first coil 621 and a second coil 622 arranged adjacent to one another, which extend from the top of the chamber 610 towards the bottom of the chamber 610. The chamber 610 is shaped to closely conform to the curvature of the first and second coils 621, 622 so that the volume of the chamber 610 is minimised. Liquid in the chamber 610 fills the void 623, 624 in the centre of each of the first and second coils 621, 622 to maximise the surface area of the heating element 620 that is in contact with liquid in the chamber 610. In other examples, the void 623, 624 in the centre of each of the first and second coils 621, 622 may be smaller relative to the thickness of the first and second coils 621, 622 than shown in FIG. 7.

The arrangements of the heating elements 520, 620 described with reference to FIGS. 6 and 7 are provided by way of example only, and it is to be understood that various other arrangements of heating elements chambers could alternatively be used.

The heating element 120 may be formed from any suitable thermal conductor. In some examples, in particular if the liquid contained in the chamber 110 is water, the heating element 120 comprises copper. In some examples, the heating element 120 comprises nichrome 80/20. In other examples, the heating element 120 comprises other materials, as known in the art. The heating element 120 may be shaped so as to increase (relative to other possible shapes) or maximise the surface area of the heating element 120 and thereby increase or maximise heat transfer to the liquid contained in the chamber 110. For example, the heating element 120 may comprise tubes and these tubes may be in any suitable configuration. A tubular form may provide the heating element 120 with a large surface area within the chamber 110, which helps to facilitate the transfer of thermal energy from the heating element 120 to liquid in the chamber 110. In some examples, a larger surface area of the heating element 120 is advantageous compared to a smaller surface area of the heating element 120. An increased surface area will help to increase the transfer of heat to the liquid in the chamber 110 from the heating element 120 and thus greater conduction of heat and a more efficient energy dissipation apparatus. The heating element 120 may be configured to resist deformation when subjected to high pressure.

The design of the heating element 120 may be dependent on the nature of an anticipated braking event for which heat is to be dissipated by the apparatus 100, and thus the anticipated boiling regime of the liquid in the chamber 110. For example, the heating element may be designed such that the critical heat flux is not exceeded. Beyond the critical heat flux, heat transfer is greatly reduced. Therefore, exceeding this point will result in reduce dissipation of energy compares to before the critical heat flux, which may in turn cause spikes in the temperature and pressure in the chamber 110.

The size of the heating element 120 is dependent on the volume of liquid that the chamber 110 can contain and the shape of the chamber 110. For example, the diameter of the tube(s) of the heating element 120 may be dependent on the dimensions of the chamber 110 and the amount of electrical current that the heating element 120 will receive. An increasing in the dimensions of the chamber 110 may require an increase in the size of the heating element 120 so that there is a greater surface area of the heating element 120 in contact with the liquid contained in the chamber 110.

Figure 3:
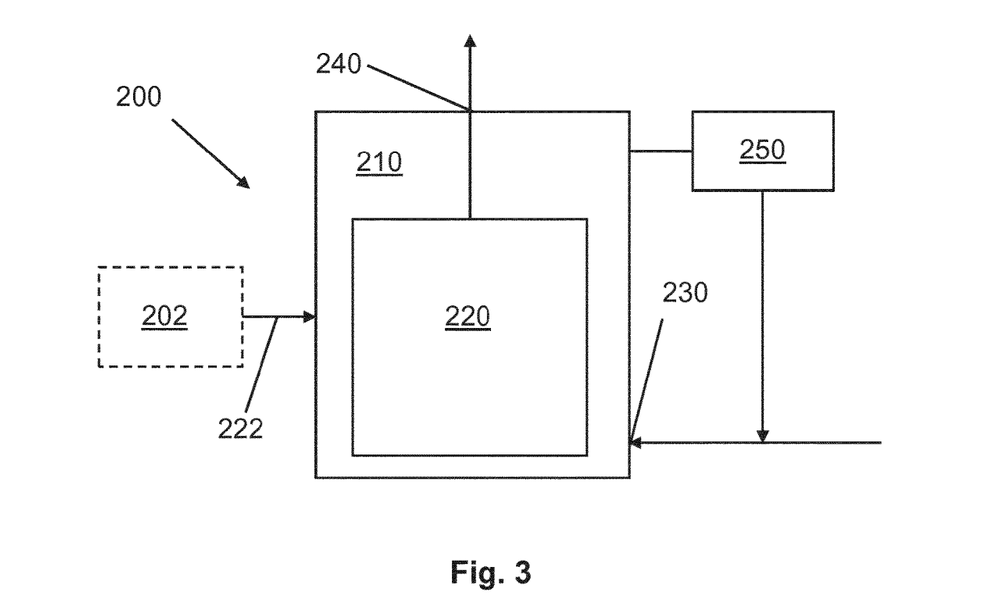
FIG. 3 is a schematic view of an apparatus for dissipating braking energy generated by operation of a vehicle brake, according to an embodiment.

Some examples of the present invention comprise an 'open' apparatus, in which the chamber 110 is at atmospheric pressure, as shown for example in FIG. 3. The term "open" is used to indicate that the chamber is in equilibrium with the surrounding environment, and is therefore at the same pressure as the surrounding environment. Other examples of the present invention comprise a 'pressurised' apparatus, in which the chamber 110 is as shown for example in FIG. 4. The term "pressurised" is used to indicate that, for at least some time during operation of the apparatus, the apparatus is configured to maintain a pressure within the chamber that is greater than the pressure of the surrounding environment. An open apparatus may be simpler than an equivalent pressurised apparatus, whereas a pressurised apparatus may be able to dissipate more energy for an equivalent size of apparatus (because a higher temperature is required to boil the liquid in the chamber). However, as pressure increases, the size, complexity and cost of the chamber 110 and associated pressure valve increase.

The apparatus 100 may be used with an electric vehicle brake 102. In this example, the vehicle is an aircraft and the apparatus 100 is configured to dissipate braking energy generated by operation of an electric brake of the aircraft, during taxi. In other examples, the vehicle may be a train, an automobile or any other type of vehicle that employs an electric vehicle brake 102.

FIG. 3 shows an example of an open apparatus 200 for dissipating energy generated by operation of a vehicle brake 202. The apparatus 200 comprises a chamber 210, a heating element 220 and an electrical connection 222, which may have any of the features of the corresponding components of the apparatus 100 shown in FIG. 1. The apparatus 200 further comprises an inlet 230 for receiving liquid into the chamber 210 and an outlet 240 for releasing vapour from the chamber 210. The inlet 230 and the outlet 240 may have any of the features of the inlet and outlet, respectively, of the apparatus 100 described above. The apparatus 200 further comprises a liquid sensor 250 to measure an amount of liquid in the chamber. The liquid sensor 250 may comprise, for example, a float sensor to measure a height level of liquid in the chamber 210. In other examples, the liquid sensor 250 may be any other type of suitable sensor known in the art. It should be noted that other examples are possible in which the apparatus 200 does not comprise a liquid sensor 250. The apparatus 200 may further comprise a controller (not shown). Components of the apparatus 200 may have any of the features of corresponding components of the apparatus 100 described above.

Figure 4:
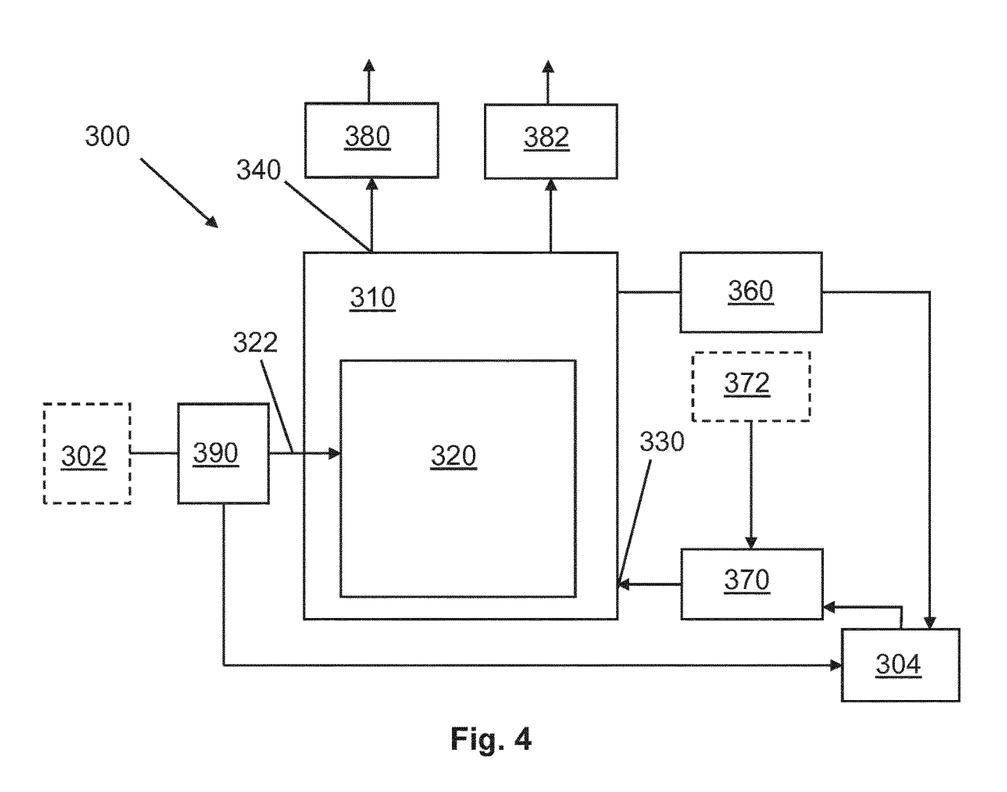
FIG. 4 is a schematic view of an apparatus for dissipating braking energy generated by operation of a vehicle brake, according to an embodiment.

FIG. 4 shows an example of a 'pressurised' apparatus 300 for dissipating energy generated by operation of a vehicle brake 302. The apparatus 300 comprises a chamber 310, a heating element 320 and an electrical connection 322, which may have any of the features of the corresponding components of the apparatus 100 shown in FIG. 1. The apparatus 300 further comprises an inlet 330 for receiving liquid into the chamber 310 and an outlet 340 for releasing vapour from the chamber 310, as described with reference to apparatus 200 shown in FIG. 3. The inlet 330 may have any of the features of the inlet of the apparatus 100 described above. The apparatus further comprises a controller 304, which in this example is a microcontroller. The apparatus 300 further comprises a temperature sensor 360 to sense the temperature of liquid in the chamber 310. In some examples, the apparatus 300 comprises a pump 370 to control a flow of liquid to the inlet 330. The pump may deliver liquid from a supply 372 to the chamber 310. The pump 370 may have any of the features of the pump described in relation to the apparatus 100. The apparatus 300 further comprises a pressure regulator 380, which may be located at or near the outlet 340 of the chamber 310. In some examples, the apparatus 300 further comprises a safety valve 382. Components of the apparatus 300 may have any of the features of corresponding components of the apparatus 100 described above.

The pressure regulator 380 is configured to prevent the pressure in the chamber 310 from exceeding a predetermined pressure during operation of the apparatus 300, e.g. by controlling a rate of release of vapour from the chamber 310. The pressure regulator 380 may be a mechanical, electrical or electro-mechanical regulator. For example, the pressure regulator 380 may be a valve, the valve configured to release vapour from the chamber 310 through the outlet 340 when the pressure in the chamber 310 reaches the predetermined pressure. In some examples, the pressure regulator is controlled by a control system (not shown) of the apparatus 300. The pressure regulator 380 may be connected (by a wired or wireless communications link) to the controller 304, and may be configured to thereby receive control signals from the controller 304, and/or to send state information to the controller 304.

The predetermined pressure may be in the range 2 bar to 10 bar. The predetermined pressure may be in the range 6 bar to 9 bar. In some examples, the predetermined pressure is selectable. For example, the predetermined pressure may be selected (manually by a human operator, or by the controller 304 of the apparatus 300) based on an operating parameter of the apparatus 300, the vehicle and/or the vehicle brake 302. Such an operating parameter may include, for example, the altitude of the vehicle or the atmospheric temperature. However; the effects of such operating parameters will typically be small, so that a particular predetermined pressure will be suitable across a range of operating parameters and may generally not need to be altered during operation of a particular vehicle.

In examples comprising a safety valve 382, the safety valve 382 is configured to prevent the pressure in the chamber 310 from exceeding a safety pressure during operation of the apparatus 300. The safety pressure may be higher than the predetermined pressure. The safety valve is configured to provide a backup in the event that the pressure regulator 380 fails, to prevent pressure in the chamber 310 reaching a level which could damage the apparatus 300. The safety valve may, in some examples, have a simpler design than the pressure regulator 380. The safety valve may, but need not, have a communications link with the controller 304.

Operation of example apparatus according to the invention will now be discussed. During operation of an apparatus for dissipating energy generated by operation of a vehicle brake (e.g. the apparatus 100, 200 or 300), the heating element receives electric current generated by operation of the vehicle brake via the electrical connection, causing the temperature of the heating element to increase. This, in turn, causes the temperature of the liquid in the chamber to increase by conduction of thermal energy from the heating element to the liquid. In some instances, the liquid in the chamber boils as a result of the conduction and the resultant vapour is released from the chamber, for example, through an outlet. The vapour may be released to atmosphere, or alternatively may be collected and condensed, for example, to re-supply the chamber.

Figure 2:
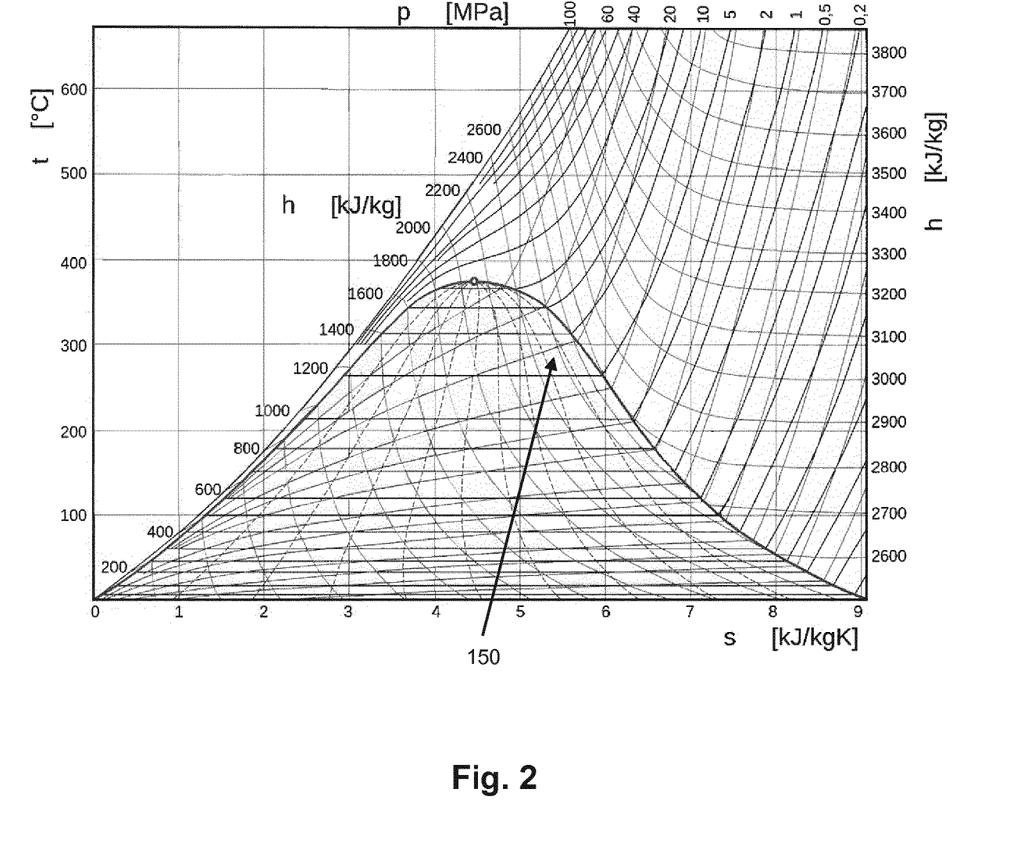
FIG. 2 is a Temperature-entropy diagram for water (source: Kaboldy/CC-BY-SA-3.0)

FIG. 2 shows a Temperature-entropy (T-s) diagram for water, which demonstrates how the characteristics an example apparatus according to the invention (e.g. the apparatus 100, 200, 300, 400) may change in dependence on the pressure in the chamber 110. The saturation curve 150 denotes the point at which saturation occurs at different pressures. For example, the diagram shows that, for a pressure of 1 bar (0.1 MPa), the saturation point (on the saturation curve 150) of the liquid is at 100° C., whereas at 8 bar (0.8 MPa), the saturation point is at approximately 170° C. This means that, at 8 bar, the liquid in the chamber must be heated to 170° C. before it boils and becomes vapour (steam). Therefore, a pressurised apparatus will vaporise less liquid to dissipate the same amount of energy as compared to an open apparatus because it will take more energy to heat the liquid to boiling, and the liquid is converted to vapour at a higher value of enthalpy (h). The T-s diagram would be different for other liquids.

FIG. 2 shows that increasing pressure above approximately 20 bar does not increase enthalpy. It can also be seen from FIG. 2 that increasing pressure above approximately 10 bar does not significantly increase enthalpy. It may therefore be advantageous, in examples in which the liquid comprises water, to configure an apparatus according to the invention to operate at a pressure of around 8 bar in order to achieve a useful amount of energy dissipation with a relatively simple pressure chamber and valve.

In the example open apparatus of FIG. 3, a flow of liquid through the inlet 230 is controlled (e.g. by a controller) based on the amount of liquid in the chamber 210 measured by the liquid sensor 250, thereby ensuring that the chamber 210 always contains a sufficient amount of liquid during operation of the apparatus 200. As an example, if the liquid sensor 250 comprises a float sensor to measure a height level of liquid in the chamber 210, when the height drops below a predetermined level, a flow of liquid through the inlet 230 is increased (increasing the flow may comprise starting a flow if no flow currently exists, or increasing a flow rate) to increase the height of liquid in the chamber 110 above the predetermined level. As another example, if the liquid sensor 250 measures a mass of liquid in the chamber 210, and the controller is configured to determine an amount of liquid in the chamber 210 based on the measured mass, when the determined amount drops below a predetermined value, a flow of liquid through the inlet 230 may be increased.

A pressurised apparatus, such as the apparatus 300 shown in FIG. 4, may be configured to control a flow of liquid into the chamber in dependence on one or more of: a temperature in the chamber measured by a temperature sensor; a pressure in the chamber measured by a pressure sensor; an amount of liquid in the chamber measured by a liquid sensor; data received from a user interface and information relating to an operational parameter of the vehicle brake.

In examples in which the apparatus comprises a pressure sensor (not shown), a controller of the apparatus may be configured to control a flow of liquid into the chamber based on a measured pressure in the chamber (e.g. measured by the pressure sensor). Such pressure-based control may be provided alongside or instead of liquid amount-based control, and/or temperature-based control.

In examples in which the apparatus comprises a current sensor configured to measure an electrical current received from the vehicle brake by the heating element, a controller of the apparatus is configured to control a flow of liquid in to the chamber based on the current measured by the current sensor. For example, a flow of liquid in to the chamber may be controlled to follow a profile based on the profile of the electrical current received from the vehicle brake. In some examples, the apparatus may comprise a temperature sensor, pressure sensor and current sensor and be configured to control a flow of liquid through in to the chamber based measurements from more than one of the temperature sensor, pressure sensor and current sensor.

The configuration and operation of example controllers for the apparatus described herein will now be described. In general, an example controller (e.g. the controller 304, or a controller of the apparatus 100) is configured to receive a signal and to control a flow of liquid in to the chamber based on the received signal.

The signal received by the controller may be used to calculate or predict a rate at which liquid in the chamber may be released from the chamber as vapour (e.g. via a pressure regulator) and therefore a rate at which liquid is to be supplied the chamber (e.g. by a pump). The controller may be configured to control a pump based on the received signal (e.g. by activating, deactivating, or altering an operational parameter of the pump). The received signal may comprise measurement data generated by a sensor comprised in the apparatus. For example, the sensor may be a temperature sensor or a current sensor or a liquid sensor 250.

The controller may be configured to alter the flow of liquid in to the chamber if the received signal meets a predetermined criterion. The predetermined criterion may be selectable in dependence on the operating parameters of the apparatus 300. Alternatively, the predetermined criterion may be selectable in dependence on, by way of example only, one or more of: the type of vehicle the apparatus 300 is installed in, the environmental conditions during operation of the apparatus 300, the amount of braking energy to be dissipated by the apparatus 300 and input by a user.

In some examples, the received signal comprises an amount of liquid in the chamber measured by a liquid sensor. In such examples, the predetermined criterion may be defined such that the predetermined criterion is met if a measured amount of liquid in the chamber is less than a predetermined minimum amount. The controller may be configured to increase the flow of liquid in to the chamber if the received signal meets the predetermined criterion. A controller configures to control the flow of liquid in to the chamber based on an amount of liquid in the chamber may be particularly suitable for an open apparatus.

In some examples, the received signal comprises a temperature in the chamber measured by a temperature sensor. In such examples, the predetermined criterion may be defined such that the predetermined criterion is met if a temperature in the chamber is outside of a predetermined temperature range. The controller may be configured to decrease the flow of liquid into the chamber if the received signal indicates that the temperature in the chamber is less than a lower limit of the predetermined temperature range, and to increase the flow of liquid into the chamber if the received signal indicates that the temperature in the chamber is greater than an upper limit of the predetermined temperature range.

In some examples, the received signal comprises a pressure in the chamber measured by the pressure sensor. In such examples, the predetermined criterion may be defined such that the predetermined criterion is met if a pressure in the chamber is outside of a predetermined pressure range. The controller may be configured to increase the flow of liquid into the chamber if the received signal indicates that the pressure in the chamber is less than a lower limit of the predetermined pressure range, and to decrease the flow of liquid into the chamber if the received signal indicates that the pressure in the chamber is greater than an upper limit of the predetermined pressure range.

The controller may be configured to receive signals from a pressure regulator and/or safety valve and may alter operation of the apparatus in dependence on a state of the pressure regulator and/or safety valve.

In some examples, the received signal comprises a current received by the heating element measured by the current sensor. In such examples, the predetermined criterion may be defined such that the predetermined criterion is met if the current received by the heating element is outside of a predetermined current range. The controller may be configured to decrease the flow of liquid into the chamber if the received signal indicates that the current is less than a lower limit of the predetermined current range, and to increase the flow of liquid into the chamber if the received signal indicates that the current is greater than an upper limit of the predetermined current range.

In some examples, the received signal comprises data received from a user interface. In such examples, the signal from the user interface may be input manually or by other control systems in the vehicle. As an example, the user interface may be in the cockpit of the vehicle. The user interface may be used to control parameters of the system or to input other data, for example environmental information such as the weather, which may be used by the controller to influence operation of the system.

Figure 5:
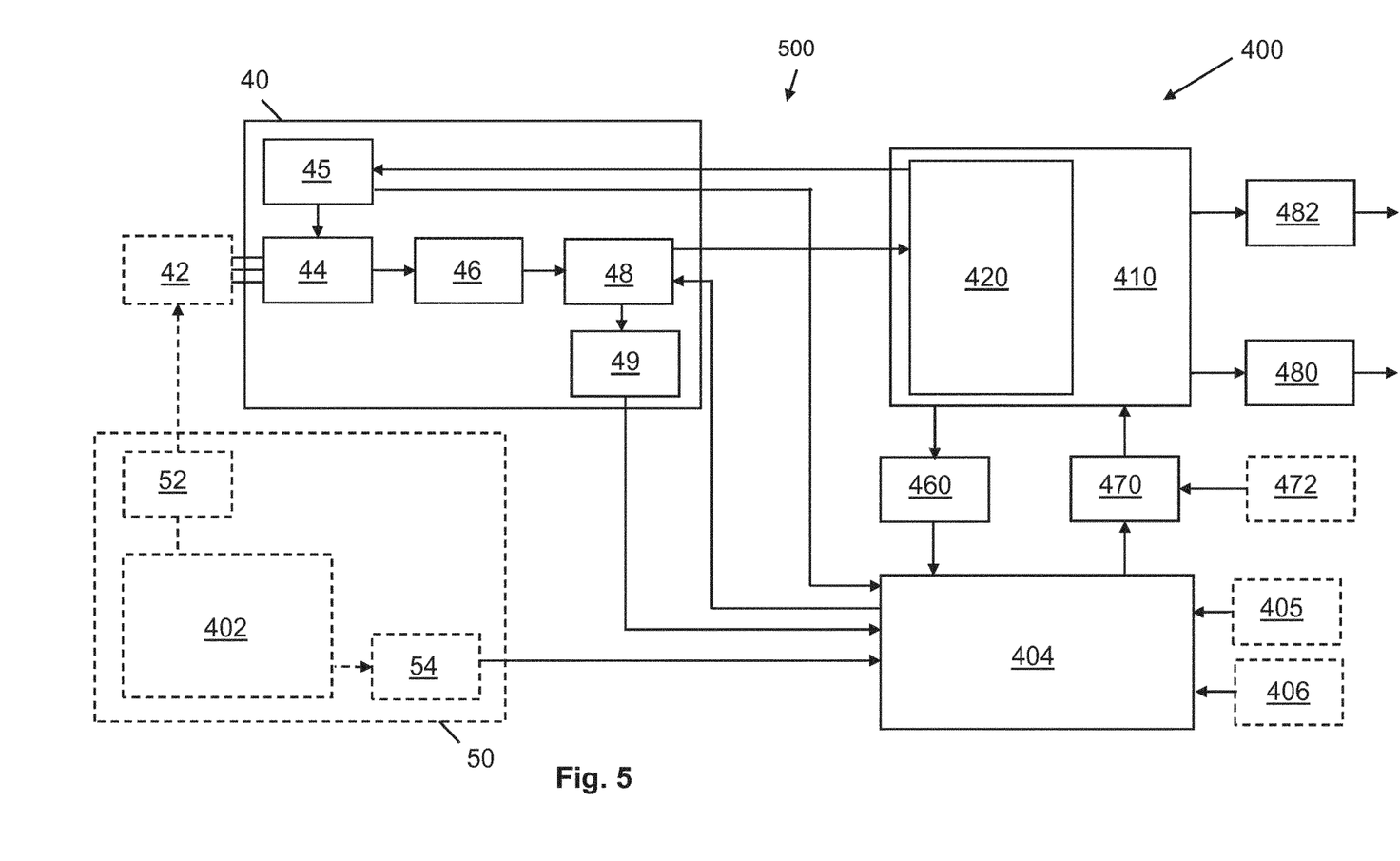
FIG. 5 is a schematic view of an apparatus for dissipating braking energy generated by operation of a vehicle brake, according to an embodiment.

In some examples, the received signal comprises information relating to an operational parameter of the vehicle brake 402. The operational parameter may be, for example, an angular velocity of the wheels of the vehicle as measured by one or more speed sensors. Alternatively the signal may represent an intensity and/or duration of brake application. As an example, the operational parameter may be a braking demand input. In such examples, the braking demand input may be a signal that is used to indicate a braking force to be applied by the vehicle brake on to the wheel(s) of the vehicle. The braking demand input may be received from a user input, for example from a driver/pilot of the vehicle pressing a brake pedal. In another example, the braking demand input may be received from another system in the vehicle, for example an automatic braking system (autobrake).

The controller 404 may be configured to receive a first signal from sensors in the apparatus 400 comprising information relating to one or more of: the temperature of liquid entering the chamber 410, the pressure in the chamber 410, the temperature in the chamber 410, the temperature of the heating element 420 and the liquid level in the chamber 410. The controller may be configured to receive a second signal from the electrical system 40 comprising information relating to one or more of: the temperature of the motor 42, the rotational speed of the motor 42, the temperature of the power transistor(s) 48 and the current transferred between the electrical system 40 and the heating element 420. The controller 404 may be configured to receive a third signal from sensors in the vehicle comprising information relating to one or more of: vehicle speed, vehicle deceleration, brake pedal deflection or equivalent manual input parameter and automatic system braking demand (analogue or digital form). The monitoring by the controller 404 may be via one or more sensors, as described above or in addition to the above. One or more of the first, second and third signals may be received by the controller 404 as a single signal.

FIG. 5 shows a schematic view of a braking system 500. The system 500 comprises an apparatus 400 for dissipating braking energy generated by operation of a vehicle brake and an electric brake assembly 50, including a brake 402. The apparatus 400 may comprise any of the features described herein with reference to apparatus 100. In the example shown in FIG. 5, the apparatus 400 comprises a chamber 410, a heating element 420, an electrical connection 22, a controller 404, a temperature sensor 460, a pump 470 for supplying liquid from a liquid supply 472, a pressure regulator 480 and a safety valve 482. In other examples, one or more of these components may be omitted. The system 500 further comprises an electrical system 40 for converting vehicle braking energy generated by operation of the vehicle brake 402 into an electric current. The electrical system 40 may be comprised in the electric brake assembly 50, in the apparatus 400, or may comprise a separate system.

The apparatus 400 is in communication various other components of a vehicle. The other components shown are: an input from a user interface 405, an input 406 via which information relating to an operational parameter of the vehicle brake 402 may be received, a motor 42 and a braking system 50.

The braking system 50 comprises a vehicle brake 402, a coupling 52 to couple the vehicle brake 402 to the motor 42, and one or more speed sensors 54. In this example, the braking system 50 is an electrical braking system.

The electrical system 40 is configured to receive an electrical current from the motor 42. The motor 42 is used as a generator for electric braking of the vehicle brake 402. In this example, the motor 42 is a three phase AC electrical motor. However, in other examples, any suitable alternative type of motor known in the art may be used. The electrical system 40 comprises a rectifier 44 for converting an AC current received by the electrical system 40 from the motor 42 into a DC current. The electrical system further comprises a voltage transient suppressor (TVS) 46 to protect electronic devices in the system 400 from damage due to the voltage spikes associated with electric braking.

The electrical system 40 also comprises one or more power transistors 48, for example an insulated-gate bipolar transistor, through which electric current from the VTS 46 is passed before being received by the heating element 420. The power transistor 48 is in communication with the controller 404 and is configured to thereby receive a signal from the controller 404. The controller 404 is configured to modulate the amount of current transferred to the heating element 420 via the electrical system 40. In some examples, the current is modulated by pulse width modulation. In these examples, the power transistor 48 is in its saturated region in use. This reduces the power dissipation of the power transistor 48 and therefore the size of its associated heatsink. The system 500 is configured such that the signal sent by the controller 404 to the power transistor 48 causes the power transistor 48 to turn fully on or fully off. In summary, the controller 404 is configured to receive a brake demand input 406 and to regulate deceleration of the vehicle by monitoring parameters of the system 500 and controlling the overall energy transfer to the liquid in the chamber 410 by varying the one/off signal to the power transistor 48.

The electrical system 40 comprises a current sensor 45 configured to measure current flowing through the heating element 420. The current sensor 45 may be connected (by a wired or wireless communications link) to the controller 404, and may be configured to thereby receive control signals from the controller 404 and/or to send state information to the controller 404. Since the resistance of the heating element 420 is fixed, the amount of power transferred to the heating element 420 can be determined my measuring the current transferred to the heating element 420 with the current sensor 45.

In some examples, the electrical system 40 comprises a temperature sensor 49 configured to measure a temperature of the power transistor 48. A signal comprising the measured temperature data may be sent to the controller 404 by the electrical system 40.

The temperature sensor 49 may be connected (by a wired or wireless communications link) to the controller 404, and may be configured to thereby receive control signals from the controller 404 and/or to send state information to the controller 404.

In some examples, electrical signals are transferred from the controller 404 to the electrical system 40, or vice versa, via one or more couplings. In some examples, the one or more couplings may comprise an optocouple to isolate and protect the controller 404 from high voltages.

The one or more speed sensors 54 comprised in the braking system 50 may be connected (by a wired or wireless communications link) to the controller 404, and may be configured to thereby receive control signals from the controller 404 and/or to send state information to the controller 404.

The controller 404 may be comprised in a control system on the vehicle. The control system may comprise one or more signal acquisition devices to convert signals received by the control system in to a form that can be processed by the controller 404. The one or more signal acquisition devices may comprise a digital signal acquisition device and/or an analogue signal acquisition device. The signal acquisition devices may receive signals from the temperature sensor 460, the speed sensor 54, the user interface 405, the input 406 and any other signals relevant to the operation of the apparatus 400.

The control system may be configured to receive a signal from a user interface 405 and send that signal to the controller 404. In some examples, the user interface 405 is configured to display parameters of the system 500, for example operational parameters. The control system may further be configured to receive an input 406 (e.g. a braking demand input) and send that as a signal to the controller 404. In some examples, the braking demand input 406 in received from a potentiometer.

In some examples according to the present invention, the apparatus 100, 200, 300, 400 is for use with an electromagnetic vehicle brake.

Figure 8:
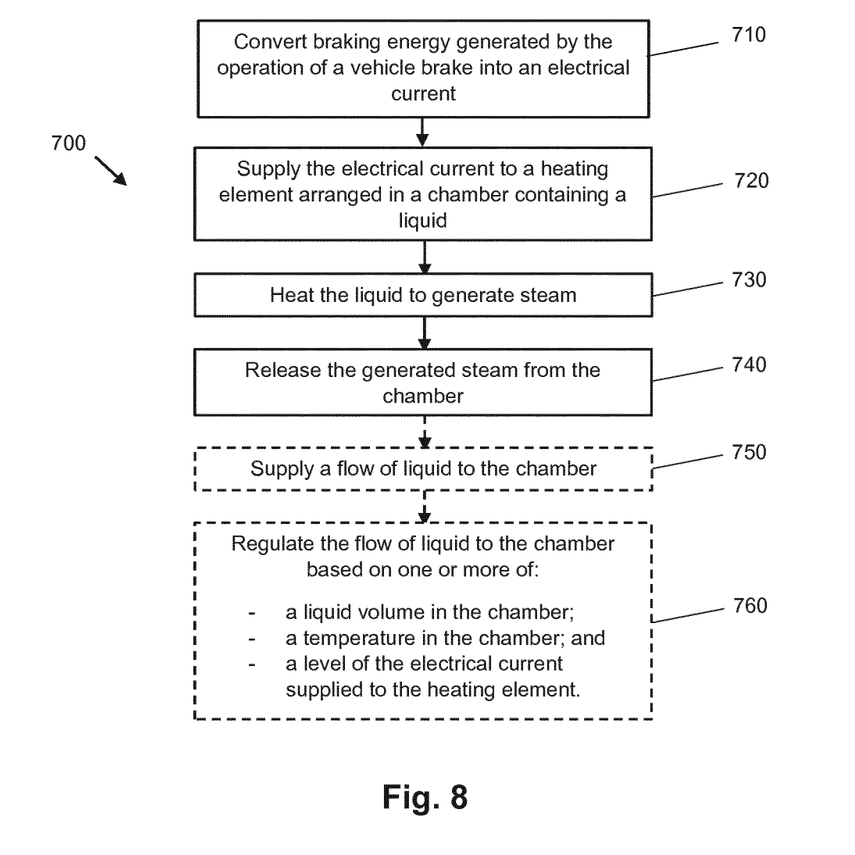
FIG. 8 is a flow chart illustrating a process for dissipating braking energy from generated by operation of a vehicle brake, according to an embodiment.

Examples of the present invention comprise a method of dissipating braking energy generated by the operation of a vehicle brake. FIG. 8 shows a method 700 according to the present invention. The method 700 may, for example, be implemented using an example apparatus discussed above, such as the apparatus 100, 200, 300 or 400.

The method 700 comprises converting 710 braking energy generated by the operation of a vehicle brake into an electric current, supplying 720 the electric current to a heating element arranged in a chamber containing a liquid, heating 730 the liquid to generate vapour and releasing 740 the generated vapour from the chamber. In the event that the vehicle brake is an electric brake, the braking energy generated by the operation of the electric brake will be converted to electric energy by the electric brake.

Heating of the liquid to generate vapour is caused by the heating element increasing in temperature when the electric current is supplied to it. The resistance of the heating element turns the electrical energy in the electric current into heat. Direct contact of the heating element with the liquid in the chamber causes the heat to pass to the liquid from the heating element by conduction. The liquid may be water, or may comprise water.

The releasing of the generated vapour from the chamber may be to the atmosphere. Alternatively, the vapour may be released to a different part of the apparatus, for example, for condensation and recycling. The method may therefore be a clean way of dissipating energy, particularly if the liquid is water, only vapour is released into the atmosphere.

In some examples, the method 700 comprises an optional step of supplying 750 a flow of liquid to the chamber. Liquid may be supplied via a pump from a liquid supply. In some examples, the method 700 comprises an optional step of regulating 760 the flow of liquid to the chamber based on one or more of: a liquid volume in the chamber, a temperature in the chamber and a level of the electric current supplied to the heating element. The regulating may be performed by an inlet valve controlled by a controller.

Figure 9:
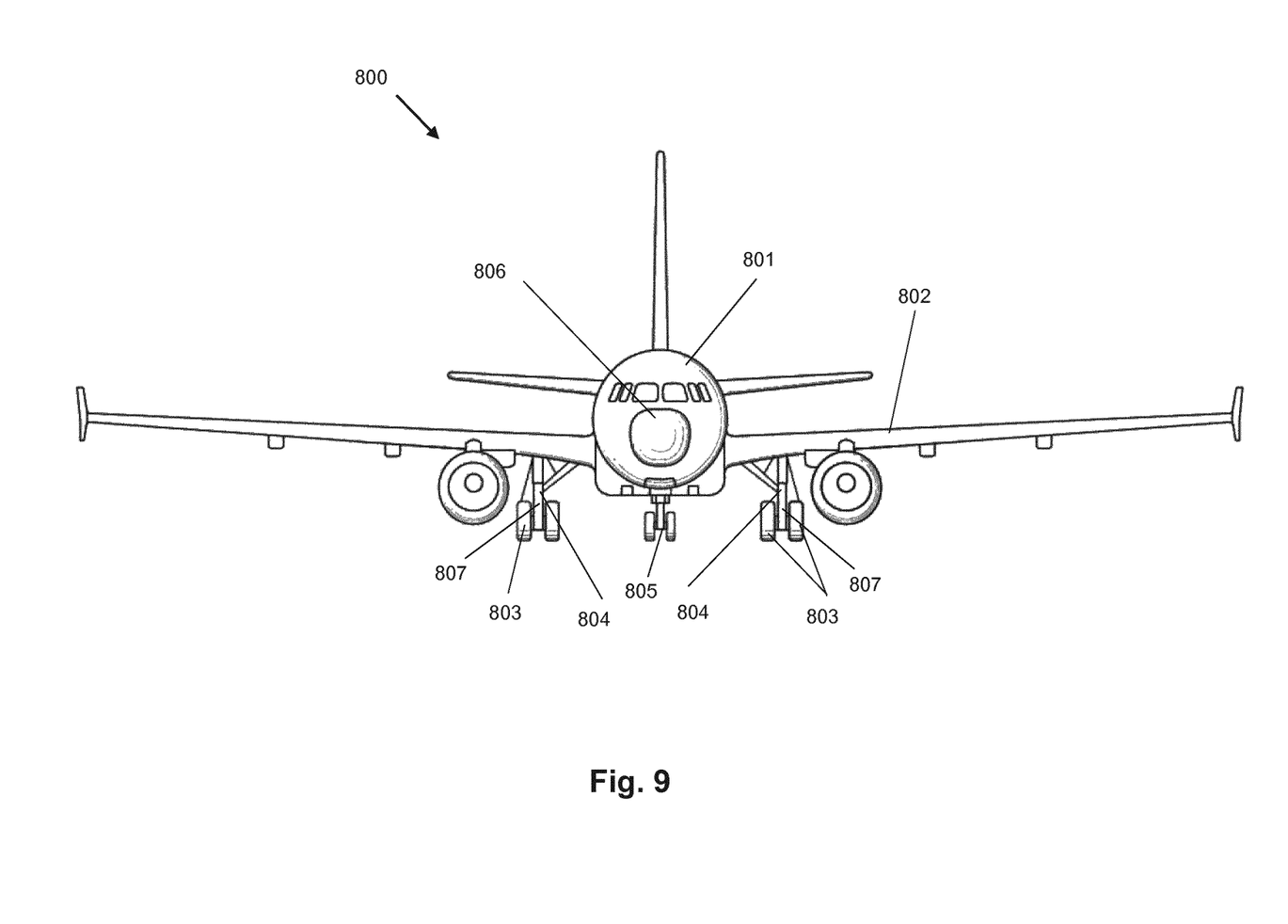
FIG. 9 is a schematic view of an aircraft comprising an apparatus for dissipating braking energy generated by operation of an aircraft brake.

FIG. 9 shows an aircraft 800 on which an apparatus according to the examples (e.g. the apparatus 100) is installed. The aircraft comprises a fuselage 801, wings 802, a main landing gear 804 and a nose landing gear 805. In the particular example, two wheels are attached to each main landing gear 804. The aircraft 800 further comprises an electrical braking system for each wheel 803 of the main landing gear 804. The aircraft 800 further comprises one or more apparatus 807 for dissipating braking energy of an aircraft brake. The, or each, apparatus 807 may comprise any of the example apparatus 100, 200, 300, 400 described above. In this example, the aircraft 800 comprises one apparatus 807 per main landing gear 804. In other examples, the aircraft 800 comprises one apparatus 807 per each electrical braking system. In yet other examples, the aircraft comprises a single apparatus 807, which receives electrical current from all of the electrical braking systems comprised in the aircraft 800.

The aircraft 800 further comprises an avionics system 806. The avionics system 806 is located in an avionics bay or compartment. In the particular example, the avionics bay is in the nose of the aircraft below the cockpit, but it may be in a different location depending on the type of aircraft. The avionics system 806 comprises the electronic systems associated with flying the aircraft, including airborne communication and navigation systems and flight control systems. The avionics system 806 may comprise all of the electronics associated with communicating information to other parts of the aircraft 800.

In some examples, the avionics system 806 is in communication with the one or more controllers of the one or more respective apparatus' 807. In some examples, the avionics system comprises the one or more controllers of the one or more apparatus' 807.

The above examples are to be understood as illustrative examples of the invention. Further examples of the invention are envisaged. For example, an apparatus according to the present invention may be configured such that the heating element receives an electric current from a plurality of vehicle brakes, or the apparatus may be for dissipating braking energy generated by a brake for machinery, rather than a vehicle. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. An apparatus for dissipating braking energy generated by the operation of a vehicle brake, the apparatus comprising:
a heating element configured to receive electric current generated by operation of the vehicle brake,
a chamber configured to contain a fluid and the heating element immersed in a liquid phase of the fluid, wherein the chamber includes a liquid inlet for the liquid phase of the fluid and a vapor outlet for a vapor phase of the fluid, and wherein the chamber is configured to release the fluid from the chamber only in the vapor phase during a braking event of the vehicle brake,
wherein the apparatus is configured such that the fluid in the liquid phase contained in the chamber is boiled to convert the fluid to the vapor phase in response to operation of the vehicle brake.

2. The apparatus according to claim 1, comprising a pressure regulator configured to prevent vapor pressure in the chamber from exceeding a predetermined pressure during operation of the apparatus.

3. The apparatus according to claim 1, comprising a liquid sensor configured to measure an amount of the liquid phase in the chamber, wherein a flow of the liquid phase through the liquid inlet is controlled based on a measured amount of the liquid phase in the chamber.

4. The apparatus according to claim 1, comprising a temperature sensor configured to sense temperature of the fluid in the chamber, wherein the apparatus is configured to control a flow of the liquid phase through the liquid inlet in dependence on the temperature of the fluid in the chamber.

5. The apparatus according to claim 1, wherein the apparatus is configured to control a flow of the liquid phase through the liquid inlet in dependence on a level of the electric current received by the heating element.

6. The apparatus according to claim 1, further comprising a pump configured to control a flow of the liquid phase to the liquid inlet.

7. The apparatus according to claim 1, wherein the vehicle brake is an electromagnetic brake.

8. An aircraft comprising an apparatus according to claim 1.

9. An aircraft according to claim 8, further comprising an electronic braking system.

10. A method of dissipating braking energy generated by the operation of a vehicle brake, the method comprising:
converting braking energy generated by operation of a vehicle brake into an electric current;
supplying the electric current to a heating element arranged in a chamber containing a liquid, wherein the chamber configured to contain a fluid and the heating element immersed in a liquid phase of the fluid, wherein the chamber includes a liquid inlet for receiving the liquid phase of the liquid and a vapor outlet for releasing a vapor phase of the liquid, and wherein the chamber is configured to release the fluid from the chamber only in the vapor phase during a braking event of the vehicle brake; and;
boiling the liquid to generate vapor; and
releasing the generated vapor from the chamber.

11. The method according to claim 10, comprising:
supplying a flow of liquid to the chamber; and regulating the flow of liquid to the chamber based on one or more of:
  a liquid volume in the chamber;
  a temperature in the chamber; and
  a level of the electric current supplied to the heating element.

12. An apparatus for dissipating braking energy generated by the operation of a vehicle brake, the apparatus comprising:
  a heating element configured to receive electric current generated by operation of the vehicle brake;
  a chamber configured to contain a fluid and the heating element immersed in a liquid phase of the fluid, wherein the chamber includes a liquid inlet for the liquid phase of the fluid and a vapor outlet for a vapor phase of the fluid, and wherein the chamber is configured to release the fluid from the chamber only in the vapor phase during a braking event of the vehicle brake, and
  a pressure regulator configured to prevent pressure in the chamber from exceeding a predetermined pressure during operation of the apparatus, wherein the predetermined pressure is in a range of 2 bar to 10 bar.

13. An apparatus for dissipating braking energy generated by the operation of a vehicle brake, the apparatus comprising:
  a heating element configured to receive electric current generated by operation of the vehicle brake;
  a chamber configured to contain a liquid and the heating element immersed in the liquid, wherein the chamber includes a liquid inlet for receiving the liquid and a vapor outlet for releasing a vapor phase of the liquid, and wherein the chamber is configured to release the fluid from the chamber only in the vapor phase during a braking event of the vehicle brake; and
  a controller configured to receive a signal and to control a flow of the liquid through the liquid inlet and into the chamber based on the received signal.

14. The apparatus according to claim 13, wherein the controller is configured to alter the flow of the liquid phase in to the chamber if the received signal meets a predetermined criterion.

15. The apparatus according to claim 14, wherein the received signal indicates an amount of the liquid phase in the chamber measured by the liquid sensor;
  the predetermined criterion is defined such that the predetermined criterion is met if a measured amount of the liquid phase in the chamber is less than a predetermined minimum amount; and
  the controller is configured to increase the flow of the liquid phase through the liquid inlet and into the chamber if the received signal meets the predetermined criterion.

16. The apparatus according to claim 14:
  wherein the received signal indicates a temperature in the chamber measured by the temperature sensor; and
  the predetermined criterion is defined such that the predetermined criterion is met if a temperature in the chamber is outside of a predetermined temperature range.

17. The apparatus according to claim 16, wherein the controller is configured to decrease the flow of the liquid phase into the chamber if the received signal indicates that the temperature in the chamber is less than a lower limit of the predetermined temperature range, and to increase the flow of the liquid phase into the chamber if the received signal indicates that the temperature in the chamber is greater than an upper limit of the predetermined temperature range.

18. The apparatus according to claim 14, wherein the received signal indicates a pressure of the vapor phase in the chamber measured by a pressure sensor; and the predetermined criterion is defined such that the predetermined criterion is met if a pressure of the vapor phase in the chamber is outside of a predetermined pressure range.

19. The apparatus according to claim 18, wherein the controller is configured to increase the flow of liquid into the chamber if the received signal indicates that the pressure in the chamber is less than a lower limit of the predetermined pressure range, and to decrease the flow of liquid into the chamber if the received signal indicates that the pressure in the chamber is greater than an upper limit of the predetermined pressure range.

20. The apparatus according to claim 13, wherein the received signal comprises one or more of: data received from a user interface; and information relating to an operational parameter of the vehicle brake.

21. An aircraft comprising the apparatus according to claim 13, wherein the controller is in an avionics system of the aircraft.

* * * * *